UNITED STATES PATENT OFFICE.

RICHARD V. MATTISON, OF AMBLER, PENNSYLVANIA.

NON-HEAT-CONDUCTING COMPOSITION FOR COATING BOILERS.

SPECIFICATION forming part of Letters Patent No. 492,094, dated February 21, 1893.

Application filed October 26, 1892. Serial No. 450,072. (No specimens.)

*To all whom it may concern:*

Be it known that I, RICHARD V. MATTISON, a citizen of the United States, residing at Ambler, county of Montgomery, and State of Pennsylvania, have invented a new and useful Improvement in Non-Heat-Conducting Compositions for Covering Boilers, Steam-Pipes, &c., of which the following is a full, clear, and exact description.

My invention has for its object to produce a non-heat-conducting composition for covering steam pipes and boilers. I accomplish this in the following manner. I take carbonate of magnesium, ground, in a pasty state twenty parts by weight, carbonate of calcium fifty parts by weight, asbestus ten parts by weight, wood pulp twenty parts by weight. I find the above proportions give good results, but they may be varied considerably and still produce good results. These materials are mixed together in a ground and pasty state with water in a pug-mill or similar mixer, and then made into molded sections for covering boilers or pipes. The usual canvas covering is placed over them when applied to boilers or pipes.

Having now fully described my invention, what I claim, and desire to protect by Letters Patent, is—

A non-heat-conducting compound composed of carbonate of magnesium, carbonate of calcium, asbestus and wood pulp, substantially as described.

In testimony of which invention I have hereunto set my hand.

RICHARD V. MATTISON.

Witnesses:
   GEO. W. REED,
   FRANK S. BUSSER.